Dec. 11, 1945.  W. A. DERR  2,390,782
CIRCUIT BREAKER CONTROL SYSTEM
Filed March 31, 1942  3 Sheets-Sheet 1

Fig.1A.

WITNESSES:  INVENTOR
E.A. McCloskey  Willard A. Derr.
Joe Weber  BY
  W. R. Coley
  ATTORNEY

Fig. 1C.

Patented Dec. 11, 1945

2,390,782

UNITED STATES PATENT OFFICE 2,390,782

CIRCUIT BREAKER CONTROL SYSTEM

Willard A. Derr, Wilkinsburg, Pa., assignor to Westinghouse Electric Corporation, East Pittsburgh, Pa., a corporation of Pennsylvania Application March 31, 1942, Serial No. 437,005

17 Claims. (Cl. 175—294)

The present invention relates, generally, to circuit breaker control systems, and, more particularly, to control systems for a plurality of automatic reclosing circuit breakers.

In the operation of power distribution systems, it is common practice to transmit power to and from stations of the power system over a plurality of circuits which are connected to a common bus at the stations. The several circuits which are connected to a common bus at a station are often connected to different stations and it is often necessary, in order to insure the greatest continuity of service, that certain of the circuits be given preference in supplying power to the station in the event that there is an interruption of power flow or any system disturbance that is likely to cause an interruption of power flow.

An object of the invention is to provide a control system for a plurality of automatic reclosing circuit breakers at a power station which shall function in response to the operation of the breakers and the potentials on the several circuits controlled by the breakers to selectively reclose the breakers and synchronize the potentials on the circuits before closing the breakers in a predetermined order of preference.

Another object of the invention is to provide a plurality of automatic reclosing circuit breakers with a control system which shall function to selectively reclose the breakers a desired number of times depending upon the potential conditions on the two sides of the breakers and to selectively close the breakers after synchronizing the systems connected to the two sides of the breakers in a predetermined order.

Another object of the invention is to provide an automatic reclosing circuit breaker control system which shall function to close a breaker in response to potentials on the circuits connected to the breaker when synchronism between the potentials is reached and to prevent reclosure of the breaker in response to synchronism in the event that the breaker opens within a predetermined time after such closure in response to synchronism.

A further object of the invention is to provide a control system for a plurality of circuit breakers, which shall function to automatically control the breakers as desired and to manually control the breakers as desired subject to the operation of the automatic control means.

These and other objects of the invention will be apparent from the following detailed description taken in connection with the accompanying drawings in which the three sheets comprising Fig. 1-A, 1-B and 1-C when joined together as indicated constitute a single figure which is a diagrammatic representation of a control system for a plurality of circuit breakers embodying the principal features of the invention. Similar elements of apparatus associated with the separate circuit breakers have been designated by similar reference characters to facilitate easy understanding of the functional relationships of the several elements of apparatus.

Figure 1A:
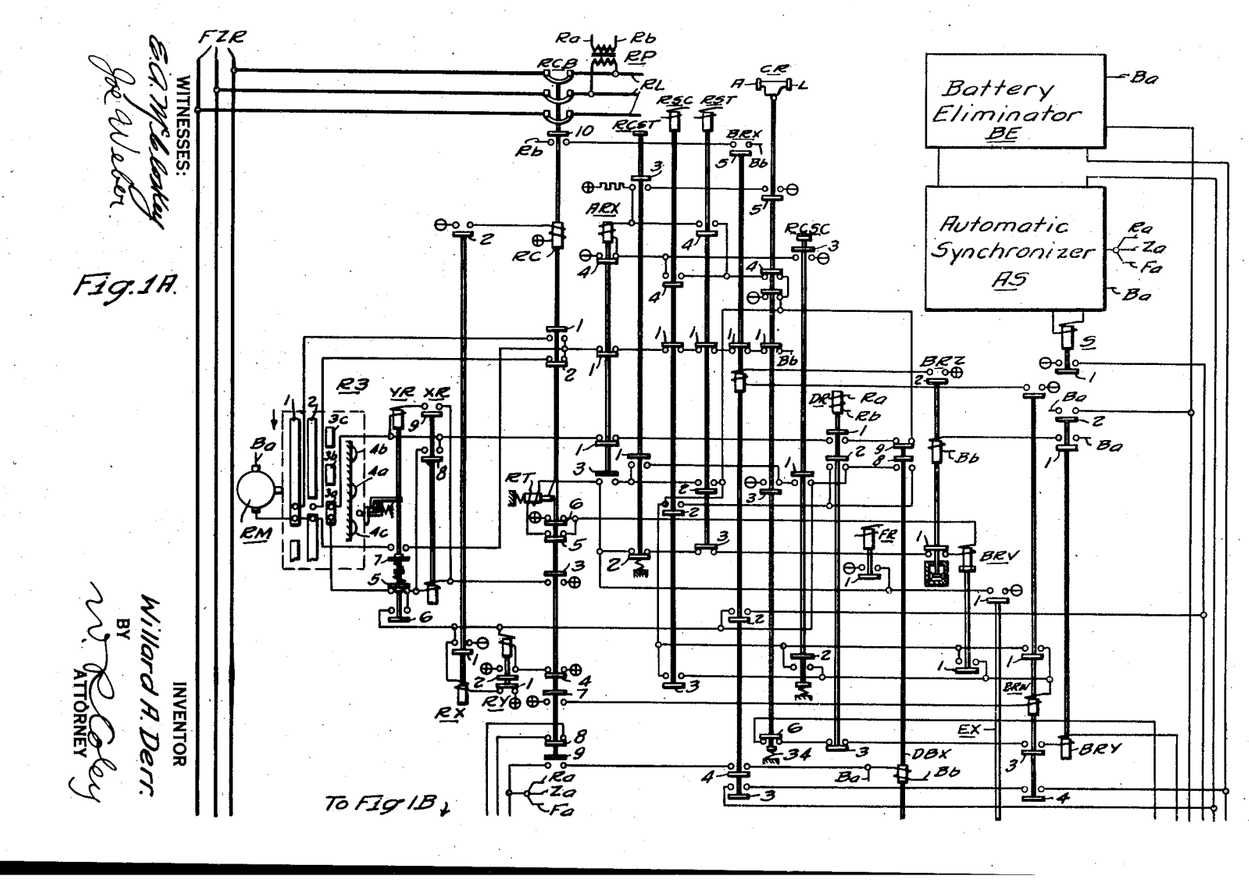
Figure 1B:
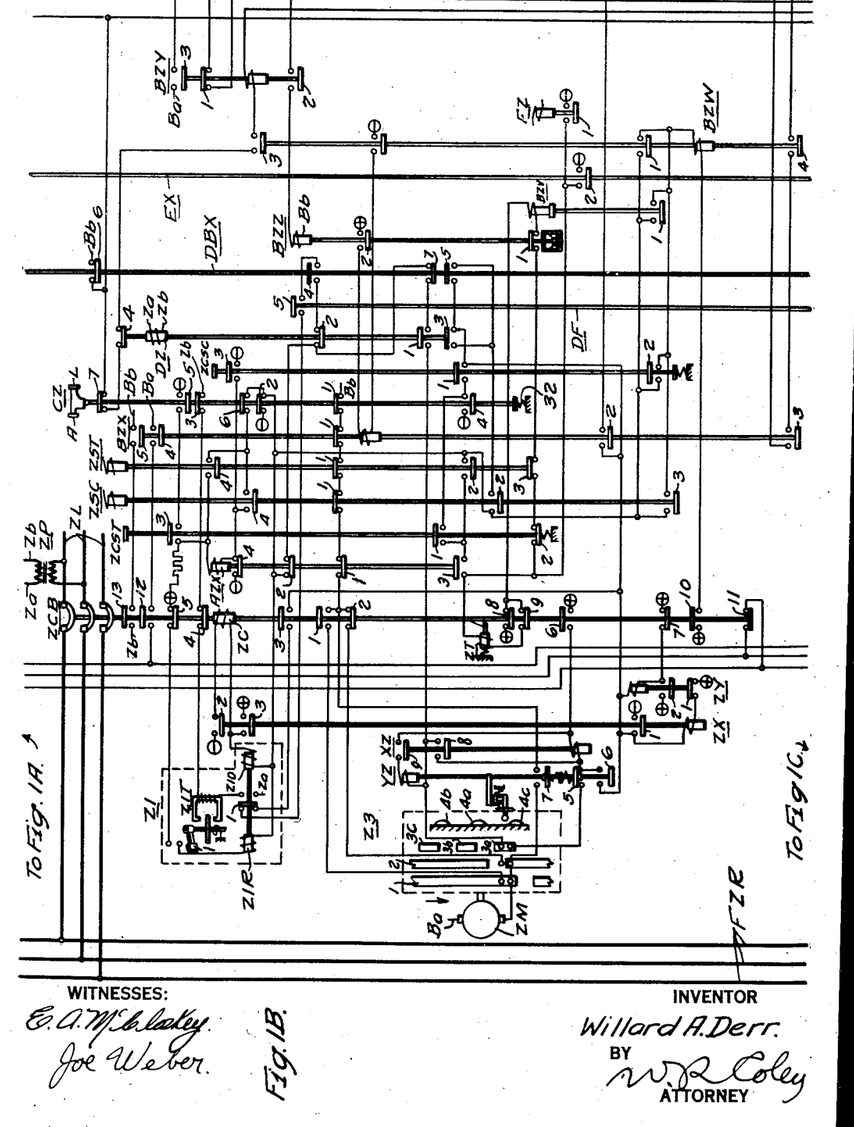
Figure 1C:
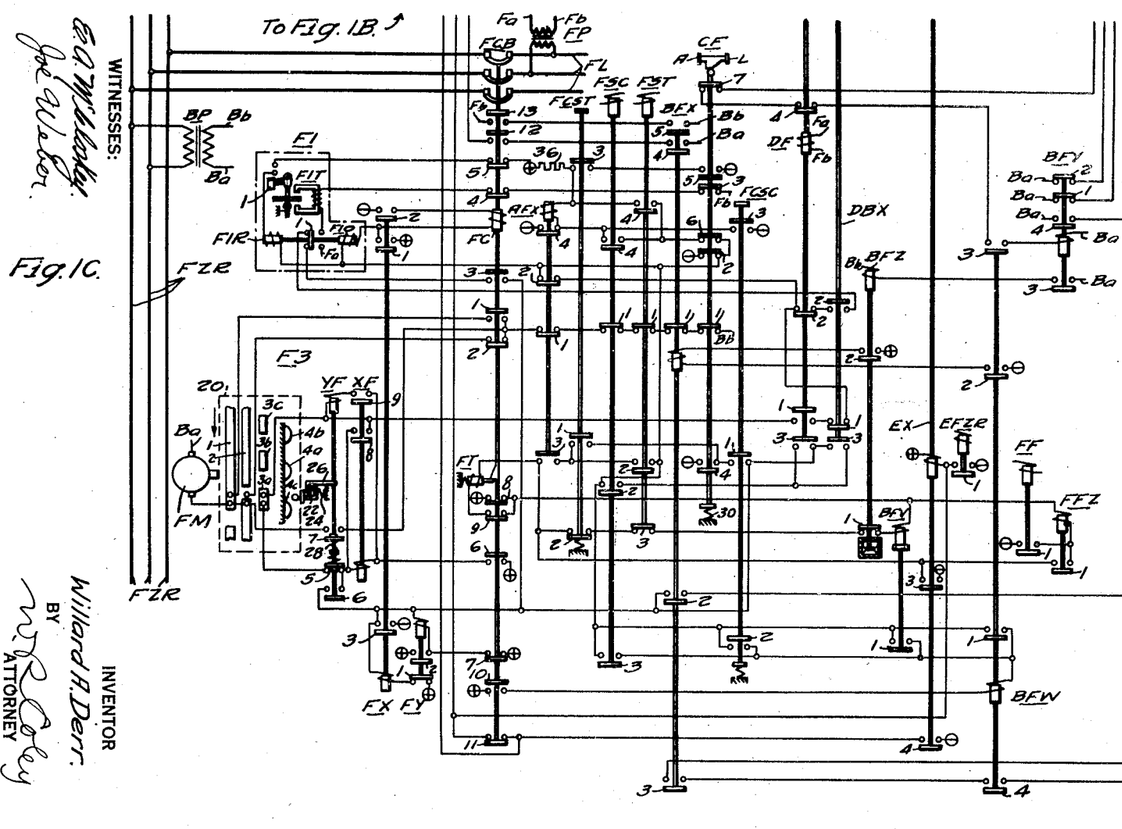

In practicing the invention, circuit breakers FCB, ZCB and RCB are disposed to connect power circuits FL, ZL and RL to a main power bus FZR as indicated in the drawings. The breakers FCB, ZCB and RCB are provided with trip devices FT, ZT and RT, respectively, which may be energized upon the actuation of fault responsive relays FF, FZ and FR, respectively, supervisory control relays FST, ZST and RST, respectively, and manually operable circuit control devices FCST, ZCST and RCST, respectively. A fault responsive relay EFZR is disposed to energize trip devices FT, ZT and RT upon the occurrence of a fault on the bus FZR.

The breakers FCB, ZCB and RCB are provided with closing devices FC, ZC and RC, respectively, the energizations of which are controlled by reclosing devices F3, Z3 and R3, a synchronism responsive device AS, supervisory control relays FSC, ZSC and RSC, and manually operable control devices FCSC, ZCSC and RCSC. The closing devices FC and ZC are also controlled by reclosing devices FI and ZI, respectively.

For the purpose of simplification the energizing circuits for the fault relays FF, FZ, FR and EFZR have not been illustrated in the drawings, it being understood that these relays may be energized by any well known means when a fault occurs on the circuits with which they are associated. Similarly, the supervisory control system for actuating the relays FSC, FST, ZSC, ZST, RSC and RST have not been shown, it being understood that these supervisory control relays may be selectively energized as desired by any well known supervisory control system.

Transfer switches CF, CZ and CR are actuated by a cam operator as shown by the operating members A and L to selectively prepare the control systems of the individual circuit breakers for automatic operation and local manual operation, respectively. These transfer switches are shown in the drawings in the automatic position.

Direct current control power may be supplied by any well known source of direct current power and connections to such a source are indicated in the drawings by positive and negative signs. Potential transformers FP, ZP, RP and BP are connected to be energized by the potentials of the circuits FL, ZL and RL and the bus FZR respectively and supply energizing potentials for various parts of the control system as will be explained in detail hereinafter. The terminals of these transformers are indicated by the reference characters Fa, Fb, Za, Zb, Ra, Rb, Ba and Bb and connections to these terminals are indicated by the identical reference characters to thereby simplify the drawings by obviating the necessity of showing a conductor on the drawings for each of these connections.

The elements of the control system, their construction, functioning and cooperative relationships may best be understood by the following complete description of the operation of the system. In the description of the elements of apparatus and the apparatus and contact elements which comprise the circuits, the elements of apparatus are referred to by reference characters comprising letters and numbers and the contact elements of the apparatus and relays are designated by numbers attached to the apparatus reference characters. Thus, for example, the contact elements of the relay FX are FX—1, FX—2 and FX—3. For further simplification, the circuits have been so illustrated as to require no reference to the individual conductors of the circuits and are referred to by listing the apparatus elements and contact elements in the circuits. Thus, for example, the holding circuit for the relay FX extends from positive potential through FY—1, FX and FX—3 to negative potential, and the energizing circuit for the relay BFZ extends from Ba through BFY—3 and BFZ to Bb.

*Operation on line fault*

Assume the circuit breakers FCB, ZCB and RCB to be in their normal closed position, the transfer switches CF, CZ and CR in the "automatic" position, and the other elements of the system in the positions shown in the drawings. If a fault should occur on the power line circuit FL the fault relay FF will be energized to in turn energize the relay FFZ in a circuit extending from positive potential through FCB—8, FFZ and FF—1 to negative potential. The relays FF and FFZ will energize the trip device FT of the circuit breaker FCB in a circuit extending from positive potential through FCB—8, FCB—9 FT, FFZ—1 and FF—1 to negative potential. The relays FF and FFZ will also energize a delayed-release relay BFV in a circuit extending from positive potential through FCB—8, BFV, BFZ—1, FST—3, FCST—2, FFZ—1 and FF—1 to negative potential.

When the breaker FCB opens as a result of the actuation of its trip device FT, the power circuit FL will be deenergized by the action of the circuit breaker FCB and similar action of a circuit breaker (not shown) at the other end of the power circuit FL. The opening of the breaker FCB and the actuation of the relay BFV will energize a relay BFW in a circuit extending from positive potential through FCB—10, BFW, BFV—1 and CF—2 to negative potential, and this circuit will be maintained until the end of the delayed-release interval of the delayed-release relay BFV after the opening of the breaker FCB opens the energizing circuit of the relay BFV at FCB—8. The relay BFW will close its own holding circuit through its contact element BFW—1 which is in parallel circuit relation with the contact element BFV—1.

The opening of the breaker FCB will energize a motor FM of an automatic recloser device F3 in a circuit from Ba through FM, F3—1, FCB—1, AFX—1, FSC—1, FST—1, BFX—1 and CF—1 to Bb. The recloser device F3 comprises a drum 20 driven by the motor FM upon which there are disposed contact elements F3—1, F3—2, F3—3a, F3—3b and F3—3c, which cooperate with stationary contact elements as illustrated. The drum 20 also actuates a series of cams 4a, 4b and 4c which are disposed to actuate a latch member 22 against the bias of a spring member 24. The latch member 22 is disposed to be actuated to the left by the spring member 24 when a relay YF is actuated, and to thus limit the release of the relay YF when the relay YF is deenergized by the engagement of the latch member 26 with the latch member 22.

The relay YF has a contact element YF—7 which is disposed to engage its cooperating contact elements after the contact element YF—5 is opened and before the contact element YF—6 has closed when the relay YF is energized and held in closed position by a spring member 28. When the relay YF is released, the latch member 26 will engage the latch member 22 and stop the release movement of the relay YF in a position with the contact elements YF—5 and YF—6 open and the contact element YF—7 closed. The cam members 4a, 4b and 4c are disposed to release the latch members 22 and 26 to permit further release of the relay YF to the position shown in the drawings.

The deenergization of the power circuit FL will deenergize a relay DF which is connected to the potential transformer FP. The opening of the breaker FCB and the release of the relay DF will energize a relay XF in a circuit extending from positive potential through FCB—6, XF, YF—5, F3—3a, DF—1, DBX—1, AFX—2 and CF—2 to negative potential. The relay XF will close its own holding circuit from positive potential through FCB—6, XF, XF—8, DF—1, DBX—1, AFX—2 and CF—2 to negative potential.

The relay XF will energize the relay YF from positive through FCB—6, XF—9, YF, DF—1, DBX—1, AFX—2 and CF—2 to negative. The relay YF will energize a relay FX from positive potential through FY—1, FX, YF—6, XF—8, DF—1, DBX—1, AFX—2 and CF—2 to negative potential. The relay YF will close another circuit for the recloser motor FM from Ba through FM, YF—7, AFX—1, FSC—1, FST—1, BFX—1 and CF—1 to Bb.

The relay FX will close its own holding circuit from positive potential through FY—1, FX and FX—3 to negative potential. The relay FX will also close an energizing circuit for the closing coil FC of the circuit breaker FCB from positive potential through FX—1, FC and FX—2 to negative potential. The closure of the circuit breaker FCB will energize the relay FY from positive potential through FCB—7, FY and FX—3 to negative potential, and will reenergize DF by reenergizing the potential transformer FP. The relay FY will close its own holding circuit from positive potential through FY—2, FY and FX—3 to negative potential. The relay FY will open the holding circuit of the relay FX at FY—1, and the release of the relay FX will release the relay FY by opening the contact element FX—3

The relays XF and YF will be deenergized by the opening of the contact elements FCB—6 and DF—1. The relay YF will be latched, as described hereinbefore, with contact elements YF—5 and YF—6 open and YF—7 closed, and the recloser motor FM will remain energized through the contact element YF—7. If the circuit breaker FCB should be tripped open immediately upon reclosure, the contact element YF—5 latched open will prevent the contact element FCB—6 from reenergizing the relay XF through the contact element F3—3a.

After a time interval required for the recloser motor FM to move the cam 4a into tripping relation with the latch device 22, the latch 22 will be tripped to fully release the relay YF and the circuit breaker will be reclosed again when the contact element F3—3b is closed by the operation of the relays XF, XY and FX, as described hereinbefore, with the contact element F3—3b substituted for the contact element F3—3a.

In the event that the circuit breaker FCB is reopened after each reclosure within the interval determined by the movement of the drum 20 from F3—3a closed to F3—3b closed, the breaker will be reclosed again until in this instance, three reclosures have been made. If the breaker trips after the third reclosure, the motor FM will drive the drum 20 to lockout position with the contact element F3—1 open. It will be seen that with the circuit breaker FCB open and the relay YF released, the circuit of the motor FM will be broken and the motor will stop when the contact element F3—1 is opened. In the event that the circuit breaker FCB remains closed after any reclosure, the energizing circuit for the motor FM will be maintained through the contact elements F3—2 and FCB—2 until the drum returns to the position shown in the drawings with the contact element F3—2 open. The recloser F3 will then be reset for the next sequence of three timed reclosures as described hereinabove.

In the event that either of the circuit breakers ZCB or RCB should be opened by their respective fault-responsive relays FZ and FR, their automatic reclosures Z3 and R3 and associated apparatus will make three attempts to reclose the breakers in a manner similar to that set forth in the description of the reclosure of the circuit breaker FCB by its recloser F3.

*Operation on bus fault*

Upon the occurrence of a fault on the bus FZR, the relay EFZR will be actuated to energize a relay EX from positive potential through EX and EFZR—1 to negative potential. The relay EX will energize the trip device FT from positive potential through FCB—8, FCB—9, FT and EX—3 to negative potential. The relay EX will also energize the trip device ZT for the circuit breaker ZCB from positive potential through ZCB—8, ZCB—9, ZT and EX—2 to negative potential. The relay EX will also energize the trip device RT for the circuit breaker RCB from positive potential through RCB—6, RCB—5, RT and EX—1 to negative potential. The relay EX will close its own holding circuit from positive potential through EX, the contact elements FCB—11, ZCB—11 and RCB—8 in parallel circuit relation and contact element EX—4 to negative potential and this holding circuit will be closed until it is opened by the opening of all three of the circuit breakers.

The relay EX will also energize the relay BFV from positive potential through FCB—8, BFV, BFZ—1, FST—3, FCST—2 and EX—3 to negative potential. When the breaker FCB opens and before the delayed-release relay BFV is released, the relay BFW will be energized from positive potential through FCB—10, BFW, BFV—1, and CF—2 to negative potential. The relay BFW will close its own holding circuit by means of its contact element BFW—1 which is in parallel circuit relation with the contact element BFV—1. In a similar manner, the contact element EX—2 will energize the relay BZV which, in turn, together with the opening of the circuit breaker ZCB, will energize the relay BZW, and the relay BZW will, in turn, close its own holding circuit through its contact element BZW—1. Similarly, EX—1 will energize the relay BRV which, in turn, together with the opening of the circuit breaker RCB, will energize the relay BRW, and the relay BRW will, in turn, close its own holding circuit through its contact element BRW—1.

The deenergization of the bus FZR by the opening of the circuit breakers FCB, ZCB and RCB will deenergize the relay DBX, since the relay DBX is energized from the terminals Ba and Bb of the bus potential transformer BP.

In the event that the circuits FL, ZL and RL remain energized when their associated circuit breakers FCB, ZCB and RCB trip, or in the event that they are deenergized and then reenergized, the system will make one attempt to reenergize the bus FZR by closing the circuit breaker FCB. The relay FX will be energized from positive potential through FY—1, FX, FCB—3, F1—1 in the left-hand position, DBX—2, DF—2, AFX—2, and CF—2 to negative potential. It will be noted that the corresponding circuit for the relay ZX cannot be closed at this time, because of the open circuit position of the contact element DF—5. The actuation of the relay FX will energize the closing coil FC to close the breaker FCB as described hereinbefore.

The actuation of the relay FX will also energize the toggle operating winding F10 of the recloser F1 from positive potential through FX—1, F10 and CF—2 to negative potential. The energization of the toggle operating winding F10 will cause the contact element F1—1 to move to the right-hand contact position to energize the timing motor F1T from Fa through F1T, FCB—4 and CF—3 to Fb. If the circuit breaker FCB remains closed after the above-described immediate reclosure, the timing motor F1T will continue to operate until its contact element F1T—1 reaches contact position to energize the toggle operating winding F1R from positive potential through FCB—5, F1T—1, F1R and CF—2 to negative potential. The contact element F1—1 will be moved from the right-hand to the left-hand contact position to thereby set up the immediate reclosing circuit for the relay FX.

In the event that the circuit breaker FCB trips after being reclosed within the timing interval of the timing motor F1T, the energizing circuit for the motor F1T will be broken at contact element FCB—4, and the relay cannot be reenergized by the opening of the breaker FCB because the energizing circuit for the relay FX depends upon the contact element F1T—1 in the left-hand position.

When the bus FZR is deenergized, the reclosers F3, Z3 and R—3, whose operation was described hereinbefore, cannot function to reclose their associated breakers because of the open circuit position of contact element DBX—1, DBX—7 and DBX—9.

In the event that the circuit breaker FCB should lock out as described hereinabove after a first reclosure, there will be no further reclosures by either of the other circuit breaker so long as the power circuit FL is energized for the reason that, with potential on the circuit FL, the relay DF will be energized and the contact element DF—5 will hold the energizing circuit for the relay ZX open. There is no recloser shown corresponding to the reclosers F1 and Z1 associated with the circuit breaker RCB, but such a recloser may be employed if desired.

With the circuit breakers FCB, ZCB and RCB opened by a fault on the bus FZR as described hereinabove, if the power circuit FL should be deenergized, the relay DF will be released to open contact element DF—2 in the recloser circuit to thereby prevent reclosure of the circuit breaker FCB. The circuit breaker ZCB would make one attempt to reclose, however, with the circuit FL deenergized and the circuit ZL energized. Under these circumstances, the relay ZX will be energized from positive potential through ZY—1, ZX, ZCB—3, Z1—1 in the left-hand contact position, DF—5, DBX—4, DZ—2, AZX—2 and CZ—2 to negative potential. The circuit breaker ZCB will thus be reclosed immediately, and the recloser Z1 will prevent a second reclosure of the breaker ZCB trips again within the time interval of the timing motor Z1T as described hereinbefore in connection with the control of the circuit breaker FCB by the recloser F1.

*Operation of automatic synchronizer*

The automatic synchronizer AS may be any device which will respond to alternating-current potentials applied thereto to energize a relay S when synchronism between the potentials is reached. Such an automatic synchronizer is shown in the patent to Gulliksen No. 1,977,384, issued October 16, 1934, and reference is made to this patent for a detailed description of its construction and operation. It will be noted that such a thermionic type automatic synchronizer requires a source of direct-current power. In the present invention, this direct-current power is supplied by a "B" eliminator BE which comprises any suitable thermionic-type rectifier, and which requires an interval of energization before it will operate properly as a rectifier.

In the event that power is restored to the bus FZR and the bus is thus energized by the power circuit FL and there is potential on the power circuits ZL and RL, the automatic synchronizer will function to close first the breaker ZCB and then the breaker RCB after synchronism between the potentials on the respective power circuits ZL and RL and the bus FZR has been reached.

It will be noted that the closure of the breaker FCB will release the relay BFW by the opening of the contact element FCB—10. The relays BZW and BRW will remain actuated since the breakers ZCB and RCB are still open. When the relay DBX is actuated by the energization of the bus FZR, the relay BZY will be energized from Ba through BFY—2, BZY, BZW—3, DZ—4, CZ—7 and DBX—6 to Bb. The actuation of the relay BZY will energize the "B" eliminator BE from Ba through BZY—3, and BE to Bb. The relay BZY will also energize the delayed-pickup-delayed-release relay BZZ from Ba through BFY—1, BZY—2 and BZZ to Bb. At the end of its delayed-pickup interval, which is approximately the interval required for rendering the "B" eliminator BE operative after it is energized by the relay BZY, the relay BZZ will energize the relay BZX from positive potential through BZZ—2, BZX and BZW—2 to negative potential.

The relay BZX will connect the "B" eliminator BE with the automatic synchronizer AS from BE through AS, BZX—3, and BZW—4 to BE. The relay BZX will also connect the automatic synchronizer AS to be acted upon by the potentials of the potential transformers BP and ZP in a circuit extending from Ba through AS, Za, ZP, Zb, ZCB—13 and BZX—5 to Bb. When synchronism is reached between the bus potential and the potential on the power circuit ZL, the automatic synchronizer AS will actuate the relay S.

The relay S will energize the relay ZX from positive potential through ZY—1, ZX, BZX—2, and S—1 to negative potential. The relay ZX will function to close the circuit breaker ZCB in the manner described hereinabove in connection with the closure of the breaker FCB by the relay FX.

The closure of the breaker ZCB will deenergize the relay BZW at ZCB—10. The release of the relay BZW will deenergize the relay BZY at BZW—3, and the release of the relay BZY will energize the relay BRY from Ba through BFY—1, BZY—1, BRY, BRW—3, DR—3, CR—6 and BDX—6 to Bb. The relay BRY will energize the delayed-pickup-delayed-release relay BRZ from Ba through BRY—1 and BRZ to Bb. The relay BRY will also connect the "B" eliminator BE from Ba through BRY—2 and BE to Bb. The relay BRZ will energize the relay BRX which, in turn, will connect the automatic synchronizer AS to close the breaker RCB when synchronism is reached, as described in connection with the closure of the breaker ZCB upon the circuit ZL reaching synchronism with the bus FZR.

The circuit breaker FCB will be closed by the automatic synchronizer AS whenever this breaker is open, and there is potential on the bus FZR and the power circuit FL and its closure by the synchronizer AS will take precedence over the closure of either of the other breakers by the synchronizer. Thus, in the event that, for any reason, the breaker RCB should be closed and supplying power to the bus FZR and the breakers FCB and ZCB should be open with the circuits FL and ZL energized, the relay BFY will be energized from Ba through BFY, BFW—3, DF—4, CF—7 and DBX—6 to Bb. The relay BFY will prevent the energization of the relay BZY by opening the contact element BFY—2. The relays BFZ and BFX will then be energized to synchronize and close the breaker FCB in the manner explained hereinabove in connection with the closure of the breaker ZCB by the operation of relays BZZ and FZX.

If any of the breakers FCB, ZCB and RCB should be tripped by the fault relay EX or their respective fault relays FF, FZ and FR upon being reclosed by the automatic synchronizer AS before the release of their respective delayed-release relays BFZ, BZZ and BRZ, the respective contact elements BFZ—1, BZZ—1 and BRZ—1 will be in open circuit position and prevent the relays BFV, BZV and BRV from being energized by the fault relays FF, FZ and FR respectively to thereby prevent reclosure of the respective breakers FCB, ZCB and RCB through the automatic synchronizer.

In the event that any of the breakers should trip upon being closed by the automatic synchronizer and there is power on the associated circuit, the breaker may be connected for closure by the synchronizer by means of a manually operable local control switch. As an example, suppose that the breaker FCB should be tripped after closure by the automatic synchronizer before the relay FBZ has released, as explained hereinabove. An operator may manually actuate a control switch FCSC to thereby energize the relay BFW from positive potential through FCB—10, BFW, FCSC—2 and CF—2 to negative potential. The relay BFW will then close its own holding circuit and energize the relays BFY and BFX to thereby connect the automatic synchronizer in control relation with the breaker FCB, as described hereinabove. The breakers ZCB and RCB may be manually connected to be controlled by the automatic synchronizer whenever there is potential on both sides of the breakers, by means of the local control switches ZCSC and RCSC in the same manner that the local control switch FCSC connects the breaker FCB to be closed by the synchronizer.

The circuit breakers FCB, XCB and RCB may be placed under the control of local control switches FCSC, FCST, ZCSC, ZCST, RCSC and RCST by moving the transfer switch operators CFL, CZL and CRL to the left-hand position to thereby permit their biasing springs 30, 32 and 34 to open their front contact elements and close their back contact elements. With the transfer switch CF in the manual or local control position, the reclosers F1 and F3 are rendered inoperative by the opening of the contact elements CF—3 and CF—1, respectively.

When the transfer switch CF is in local control position, the breaker FCB may be tripped by actuating the manually operable local control switch FCST. A relay AFX is normally energized from positive potential through a current limiting resistor 36, AFX and AFX—4 to negative potential. The control switch FCST will close a shunting circuit for the relay AFX from positive potential through the resistor 36, FCST—3 and CF—5 to negative potential, thus releasing the relay AFX. The trip circuit for the breaker FCB will be closed from positive potential through FCB—8, FCB—9, FT, AFX—3, FCST—1 and CF—4 to negative potential. The breaker FCB may be closed by actuating the local control switch FCSC which will energize the relay AFX from positive potential through the resistor 36, AFX and FCSC—3 to negative potential. The relay AFX will close its own holding circuit shown in the drawings. The control switch FCSC will also energize the relay FX from positive potential through FY—1, FX, FCSC—1 and CF—4 to negative potential.

When the transfer switch CF is in the automatic position, the breaker FCB cannot be tripped by the local control switch FCST since the contact element CF—5 will be open and FCST—3 cannot shunt and release the relay AFX. However, the breaker FCB may be tripped by the supervisory control relay FST which will shunt the relay AFX from positive potential through the resistor 36, FST—4, CF—6 and CF—2 to negative potential to thereby release the relay AFX. The trip circuit for the breaker FCB will be from positive potential through FCB—8, FCB—9, FT, AFX—3, FST—2 and CF—2 to negative potential. The contact element AFX—2 will be in open position to prevent automatic reclosure of the breaker FCB when it is tripped by the supervisory control relay FST.

When the breaker FCB is tripped by the local control switch FCST or the supervisory control relay FST their control elements FCST—2 and FST—3, respectively, will be in open circuit position to prevent energization of the relay BFV and thus prevent reclosure of the breaker through the automatic synchronizer AS. The breaker FCB may be closed by the supervisory control relay FSC after it has been tripped by the supervisory control relay FST if either the circuit FL or the bus FZR is deenergized. If the bus FZR is deenergized, the relay DBX will be released and the contact element DBX—3 will be closed; if the circuit FL is deenergized, the relay DF will be released and the contact element DF—3 will be closed. The actuation of the relay FSC will energize the relay FX from positive potential through FY—1, FX, DF—3 or DBX—3, FSC—2 and CF—2 to negative potential. The relay AFX will also be energized by the relay FSC from positive potential through the resistor 36, AFX, FSC—4, CF—6 and CF—2 to negative potential. With the relay AFX energized and the transfer switch in the automatic position, the system will be reset for automatic reclosing and synchronizing operations, as explained hereinabove.

In the event that there is potential on both the bus FZR and the circuit FL when the supervisory relay FSC is actuated, the contact element FSC—3 will close the energizing circuit for the relay BFW which will initiate the hereinbefore described operations to connect the automatic synchronizer to close the breaker FCB.

When the transfer switch CF is in the local control position, the control switch FCSC may be actuated to close the breaker FCB by energizing the relay FX from positive potential through FY—1, FX, FCSC—1 and CF—4 to negative potential. It is to be understood, however, that the operator would not close any of the breakers FCB, ZCB, or RCB by means of the local control switches FCSC, ZCSC or RCSC without checking whether there is potential on both sides of the breakers and testing for synchronism by means of a synchroscope in the event that there is potential on both sides of the breakers.

It is to be understood that the control system described herein is not limited in its application to the control of only three circuit breakers that as many circuit breakers as desired may be controlled by the system described herein, that any or all of the breakers may be controlled by single shot and for triple shot reclosures such as the reclosures F1 and F3.

Thus it will be seen that I have provided an automatic reclosing circuit breaker control system which shall function in response to the operation of a plurality of breakers and the potentials on the several circuits controlled by the breakers to selectively reclose the breakers, and synchronize the potentials on the circuits before closing the breakers in a predetermined order of preference, which shall function to selectively reclose the breakers a desired number of times depending upon the potential conditions on the two sides of the breakers and which shall function to provide selective supervisory control and local manual control of the breakers subject to the potential conditions on the breakers.

It is to be understood that the invention is not limited to the precise construction shown and described herein, but it is capable of modification by one skilled in the art, the embodiment shown herein being merely illustrative of the principles of the invention.

I claim as my invention:

1. In an automatic reclosing circuit breaker control system for a pair of circuit breakers each disposed to connect a separate power circuit to a common bus, means responsive to the opening of the breakers and the conditions of the common bus and power circuits for automatically reclosing a predetermined one of the breakers in the event that there is potential on the power circuit of both of the breakers and no potential on the bus, and means for thereafter automatically reclosing the other breaker in response to synchronism between the potentials on said other breaker and the bus.

2. In an automatic reclosing circuit breaker control system, a pair of circuit breakers each disposed to connect a separate circuit to a common bus, a single synchronism responsive device comprising means for closing a breaker after the breaker is connected thereto and synchronism between the potentials on the two sides of the breaker is reached, means responsive to opening of the breakers and the potentials on the two sides of the breakers for automatically connecting a predetermined one of the breakers to be controlled by the synchronism responsive device in the event that there is potential on both sides of the breakers, and further means responsive to the closure of said predetermined one of the breakers by the synchronism responsive device for connecting the other of the breakers to be controlled by the synchronism responsive device.

3. In an automatic reclosing circuit breaker control system, a plurality of circuit breakers each disposed to connect a separate circuit to a common bus, a single synchronism responsive device comprising means for closing a breaker after the breaker is connected thereto and synchronism between the potentials on the two sides of the breaker is reached, means responsive to the opening of the breakers and the potentials on the two sides of the breakers for automatically connecting a predetermined one of the breakers to be closed by the synchronism responsive device in the event that there is potential on both sides of the breakers, and further means responsive to the closure of each preceding breaker by the synchronism responsive device for closing each of the remaining breakers in succession in a predetermined order.

4. In a control system for a circuit breaker, means for automatically reclosing the breaker immediately after it is opened in the event that potential exists on only one side of the breaker after it is opened, a synchronism responsive device for closing the breaker when connected to respond to the potentials on the two sides of the breaker and synchronism between these two potentials is reached, and means responsive to the presence of potential on the two sides of the breaker after said automatic opening of the breaker for connecting the synchronism responsive device to respond to said potentials.

5. In a control system for a circuit breaker, means for automatically reclosing the breaker immediately after it is opened in the event that potential exists on only one side of the breaker after it is opened, means for reclosing the breaker a plurality of times after said first reclosure in the event that it is opened after each reclosure and potential exists on a first side of the breaker only, and means for preventing further reclosures of the breaker in the event that it is opened within a predetermined time after the first reclosure and potential exists on the second side of the breaker only.

6. In a control system for a circuit breaker, means for automatically reclosing the breaker immediately after it is opened in the event that potential exists on only one side of the breaker after it is opened, means for reclosing the breaker a plurality of times after said first reclosure in the event that it is opened after each reclosure and potential exists on a first side of the breaker only, means for preventing further reclosures of the breaker in the event that it is opened within a predetermined time after the first reclosure and potential exists on the second side of the breaker only, a synchronism responsive device for closing the breaker when connected to respond to the potentials on the two sides of the breaker and synchronism between these potentials is reached, and means responsive to the presence of potential on the two sides of the breaker after said automatic opening of the breaker for connecting the synchronism responsive device to respond to said potentials.

7. In a control system for a circuit breaker connecting two power circuits, means for automatically reclosing the breaker immediately after it is opened in the event that potential exists on the power circuit on only one side of the breaker after it is opened, means for reclosing the breaker a plurality of times after said first reclosure in the event that it is opened after each reclosure and potential exists on the power circuit on a first side of the breaker only, means for preventing further reclosures of the breaker in the event that it is opened within a predetermined time after the first reclosure and potential exists on the power circuit on a second side of the breaker only, a synchronism responsive device for closing the breaker when connected to respond to the potentials on the power circuits on both sides of the breaker and synchronism between said potentials is reached, means responsive to the presence of potential on the power circuits on both sides of the breaker after said automatic opening of the breaker for connecting the synchronism responsive device to respond to said potentials, and means responsive to the conditions of the power circuits on both sides of the breaker for preventing reclosure of the breaker in the event that no potential exists on said circuits after said automatic opening of the breaker.

8. In an automatic reclosing circuit breaker control system, a circuit breaker, a synchronism responsive device, means whereby said synchronism responsive device, when connected to respond to the potentials on the two sides of the breaker, will close the breaker when synchronism between the potentials on the two sides of the breaker is reached, means responsive to the automatic opening of the breaker and the potentials on the two sides of the breaker for connecting the synchronizer to respond to the potentials on the two sides of the breaker, means responsive to the closure of the breaker by the synchronizer for preventing another reclosure by the synchronizer in the event that the breaker is opened again within a predetermined time after the closure of the breaker, and manual means for thereafter connecting the synchronizer to reclose the breaker when synchronism between the potentials on the two sides of the breaker is reached.

9. In an automatic reclosing circuit breaker control system for a circuit breaker disposed to connect two power circuits, means responsive to the automatic opening of the breaker and the condition of the two circuits for immediately reclosing the breaker in the event that there is potential on only one of the power circuits, synchronizing means responsive to the potentials on the power circuits and the automatic opening of the breaker for closing the breaker when synchronism between the potentials on the two power circuits is reached in the event that there is potential on both of the circuits, first manually operable means for rendering said automatic reclosing means and said synchronizing means inoperative to reclose the breaker, and second manually operable means for opening and closing said breaker at will when said first manually operable means is actuated.

10. In an automatic reclosing circuit breaker control system for a circuit breaker disposed to connect two power circuits, means responsive to the automatic opening of the breaker and the condition of said power circuits for immediately automatically reclosing the breaker in the event that there is potential on only one of the power circuits and for also reclosing the breaker in the event that there is potential on both of the circuits and the potentials on the circuits are in synchronism, means for preventing a second reclosure of the breaker in the event that the breaker trips within a predetermined time after the first reclosure and there is potential on one of the circuits and not on the other, means for automatically reclosing the breaker a predetermined plurality of times in the event that there is potential on the said other circuit and not on the one circuit and the breaker trips after each reclosure, and means for preventing a second reclosure of the breaker in response to synchronism in the event that the breaker trips within a predetermined time after being reclosed in response to synchronism.

11. In an automatic reclosing circuit breaker control system, a circuit breaker disposed to connect two circuits, means responsive to the automatic opening of the breaker for automatically reclosing the breaker, remotely controlled means for opening and closing the breaker, means responsive to the operation of the remotely controlled breaker opening means for preventing operation of the automatic reclosing means, manually operable breaker opening means, manually operable breaker closing means, manually operable control means, means responsive to the actuation of the manually operable control means for preventing opening or closing of the breaker by the remotely controlled means, and means responsive to the actuation of the manually operable control means for preventing operation of the automatic reclosing means.

12. In an automatic reclosing circuit breaker control system, a circuit breaker disposed to connect two circuits, means responsive to the automatic opening of the breaker and the potentials on the circuits for automatically reclosing the breaker in the event that there is potential on one of the circuits only, means responsive to the automatic opening of the breaker and the potentials on the circuits for automatically closing the breaker in the event that there is potential on both of the circuits when synchronism between the potentials on the circuit is reached, means for preventing a second reclosure of the breaker in response to synchronism in the event that the breaker is opened automatically within a predetermined time after being reclosed in response to synchronism, remotely controlled means for opening and closing the breaker, means responsive to the operation of the remotely controlled breaker opening means for preventing operation of the automatic reclosing means responsive to the operation of the remotely controlled breaker closing means for closing the breaker when synchronism between the potential on the circuits is reached after the breaker has been prevented from reclosing automatically by being opened within a predetermined time after being reclosed in response to synchronism, manually operable breaker closing means, means responsive to the actuation of the manually operable breaker closing means for closing the breaker when synchronism between the potentials on the circuits is reached after the breaker has been prevented from reclosing automatically by being opened within a predetermined time after being reclosed in response to synchronism, manually operable breaker opening means, manually operable control means, means responsive to the actuation of the manually operable control means for preventing opening or closing of the breaker by the remotely controlled means, and means responsive to the actuation of the manually operable control means for preventing operation of the automatic reclosing means.

13. In a control system for a circuit breaker connected between two power circuits, means responsive to the opening of the breaker and the conditions of the power circuits on both sides of the breaker for automatically reclosing the breaker a predetermined number of times in the event that there is potential on the power circuit on one side of the breaker and there is no potential on the power circuit on the other and the breaker trips after each reclosure, means responsive to the opening of the breaker and the condition of the power circuits on both sides of the breaker for reclosing the breaker a single time only in the event that there is potential on the power circuit on said other side of the breaker and there is no potential on the power circuit on the said one side of the breaker, and the breaker trips after being reclosed, and means responsive to the opening of the breaker and the condition of the power circuits on both sides of the breaker for closing the breaker in the event that there is potential on the power circuits on both sides of the breaker and the potentials on said power circuits are in synchronism.

14. In an automatic reclosing system for a circuit breaker connected between two power circuits, means responsive to the opening of the breaker and the condition of the power circuits on both sides of the breaker for automatically reclosing the breaker in the event that there is potential on only one side of the breaker, means responsive to the opening of the breaker and the condition of the power circuits on both sides of the breaker for closing the breaker in the event that there is potential on the power circuits on both sides of the breaker and the potentials on said power circuits on both sides of the breaker are in synchronism, and means responsive to the reclosure of the breaker in response to synchronism for preventing a subsequent reclosure in response to synchronism in the event that the breaker is opened within a predetermined time after the said reclosure in response to synchronism.

15. In an automatic reclosing system for a circuit breaker connected between two power circuits, means responsive to the opening of the breaker and the condition of the power circuits on both sides of the breaker for automatically reclosing the breaker a predetermined plurality of times in the event that there is potential on the power circuit on one side of the breaker and there is no potential on the power circuit on the other side of the breaker and the breaker trips after each reclosure.

16. In an automatic reclosing circuit breaker system for a plurality of circuit breakers each disposed to connect a separate power circuit to a common bus, relay means responsive to the opening of the breakers and the deenergization of the common bus for effecting a reclosure of a predetermined one of the breakers in the event that the power circuits of all the breakers remain energized, and additional relay means operable in the event that the power circuit associated with said predetermined one of the breakers is deenergized when the breakers are opened for effecting a reclosure of another one of said breakers.

17. In an automatic reclosing circuit breaker system for a plurality of circuit breakers each disposed to connect a separate power circuit to a common bus, relay means responsive to a fault on the common bus for effecting the opening of all the breakers, and additional relay means jointly responsive to the opening of a predetermined one of said breakers and the deenergized condition of the common bus for effecting a reclosure of said predetermined one of the breakers in the event that the power circuits of all the breakers remain energized when said breakers are opened in response to the fault on the common bus.

WILLARD A. DERR.